United States Patent [19]
Dan et al.

[11] Patent Number: 6,047,309
[45] Date of Patent: Apr. 4, 2000

[54] RECORDING OBSERVED AND REPORTED RESPONSE CHARACTERISTICS AT SERVER AND/OR CLIENT NODES IN A REPLICATED DATA ENVIRONMENT, AND SELECTING A SERVER TO PROVIDE DATA BASED ON THE OBSERVED AND/OR REPORTED RESPONSE CHARACTERISTICS

[75] Inventors: Asit Dan, West Harrison; Martin G. Kienzle, Somers; Dinkar Sitaram, Yorktown Heights; William H. Tetzlaff, Mount Kisco, all of N.Y.

[73] Assignee: International Business Machines Corporation, Armonk, N.Y.

[21] Appl. No.: 08/537,025

[22] Filed: Oct. 2, 1995

[51] Int. Cl.⁷ .......................................... G06F 13/14
[52] U.S. Cl. ........................ 709/201; 709/243; 709/105; 709/203; 348/7
[58] Field of Search .................. 348/7; 395/200.01, 395/200.11, 835, 837, 838, 675; 709/201, 202, 203, 224–226, 223, 241, 105, 243

[56] References Cited

U.S. PATENT DOCUMENTS

| | | | |
|---|---|---|---|
| 5,031,089 | 7/1991 | Liu et al. | 709/226 |
| 5,283,897 | 2/1994 | Georgiadis et al. | 395/675 |
| 5,341,477 | 8/1994 | Pitkin et al. | 395/200.56 |
| 5,371,532 | 12/1994 | Gelman et al. | 348/7 |
| 5,414,455 | 5/1995 | Hopper et al. | 348/7 |
| 5,459,837 | 10/1995 | Caccavale | 395/184.01 |
| 5,530,557 | 6/1996 | Asit et al. | 386/125 |
| 5,544,313 | 8/1996 | Shachnai et al. | 395/200.01 |
| 5,544,327 | 8/1996 | Dan et al. | 395/200.64 |
| 5,548,724 | 8/1996 | Akizawa et al. | 395/200.03 |
| 5,553,224 | 9/1996 | Russell et al. | 395/200.57 |
| 5,561,637 | 10/1996 | Dan et al. | 365/230.03 |
| 5,577,251 | 11/1996 | Hamilton et al. | 395/671 |
| 5,583,994 | 12/1996 | Rangan | 395/200.09 |
| 5,590,117 | 12/1996 | Iida et al. | 370/248 |
| 5,610,841 | 3/1997 | Tanaka et al. | 395/200.49 |
| 5,633,924 | 5/1997 | Kaish et al. | 379/266 |
| 5,644,714 | 7/1997 | Kikinis | 395/200.49 |
| 5,664,106 | 9/1997 | Caccavale | 395/200.54 |
| 5,687,372 | 11/1997 | Hotea et al. | 395/675 |
| 5,774,668 | 6/1998 | Choquier et al. | 395/200.53 |
| 5,850,517 | 12/1998 | Verkler et al. | 395/200.32 |

OTHER PUBLICATIONS

P.B. Berra et al., "Issues in Networking and Data Management of Distributed Multimedia Systems", 1992 IEEE, pp 4–15.

S.L. hardt–Kornacki et al., "Optimization Model for the Delivery of Interactive Multimedia Documents", 1991, Globecom '91, pp 669–673 (20.2.1–20.25).

Thomas D.C. Little, "Network Considerations for Distributed Multimedia Object Composition and Communication", Nov. 1990, IEEE Network Magazine, pp 32–49.

Domenico Ferrari, "Client Requirements for Real–Time Communication Services", Nov. 1990, IEEE Communications Magazine, pp 65–72.

Primary Examiner—Eddie P. Chan
Assistant Examiner—Hong Kim
Attorney, Agent, or Firm—Heslin & Rothenberg, P.C.

[57] ABSTRACT

A system and method for use in a distributed video-on-demand system of a type wherein at least one node provides blocks of video data to clients and wherein at least some of the blocks of video data are replicated on multiple nodes. Observed response characteristics for other nodes are recorded at least a given one of the nodes which serves a client requesting a replicated block. The given one of the nodes also records response characteristics reported to it by the other nodes. The node from which to fetch the replicated data block is selected based on which nodes include a copy of the replicated data block and based on at least one of the observed response characteristics and the reported response characteristics.

33 Claims, 8 Drawing Sheets

FIG. 2A

SERVER LOAD TABLE 200

| SERVERID (210) | DELAY TIMESTAMP (220) | DELAY (230) | LOAD TIMESTAMP (240) | LOAD (250) |
|---|---|---|---|---|
| S1 | T1d | d1 | T1u | u1 |
| ... | ... | ... | ... | ... |
| ... | ... | ... | ... | ... |

FIG. 2B

VIDEO BLOCK TABLE 260

| FIELD (265) | BLOCKNO (270) | NUMBER OF REPLICAS (275) | SERV. ID (280) | | | |
|---|---|---|---|---|---|---|
| F1 | b81 | 1 | S6 | 0 | 0 | 0 |
| F2 | b95 | 3 | S3 | S1 | S10 | 0 |
| ... | ... | ... | ... | ... | ... | ... |

FIG. 2C

REQUEST TABLE 285

| REQUESTID (290) | REQUESTTIME (295) |
|---|---|
|  |  |
|  |  |

RECORDING OBSERVED AND REPORTED RESPONSE CHARACTERISTICS AT SERVER AND/OR CLIENT NODES IN A REPLICATED DATA ENVIRONMENT, AND SELECTING A SERVER TO PROVIDE DATA BASED ON THE OBSERVED AND/OR REPORTED RESPONSE CHARACTERISTICS

I. BACKGROUND OF THE INVENTION a. Field of the Invention

The present invention relates to a video on demand (VOD) systems of the type wherein multiple clients are serviced by video streams delivered from a central video server.

b. Related Art

A distributed real-time client server environment includes multiple clients and servers where each client's file system makes real-time I/O requests (i.e., requests with deadlines) to the servers responsible for retrieving the requested data. An example of such a system is a video server system consisting of multiple front-end client nodes with network adapters and back-end nodes or storage servers. In the presence of replication, the same data block may be present on multiple servers. At any random instant of time, the load (i.e., the number of requests waiting to be served or in service) on different servers is likely to be different. Additionally, different servers may have different performance characteristics (e.g., transfer speed, seek time, etc.).

A straightforward approach to server selection would be to randomly choose a server for an I/O operation. This approach, however, may require the servers to be run at a lower utilization to avoid missing deadlines.

II. SUMMARY OF THE INVENTION

In light of the forgoing, the present invention includes a system and method wherein clients use information about the observed server response time, and server performance measures to select a node to perform a given replicated function. The function can be, for example, provision of a data block available from more than one node. In a preferred embodiment, both the clients and the servers share server performance measures by piggybacking this information on normal messages passed between the clients and the servers as well as those passed between one server and another.

IV. DETAILED DESCRIPTION OF A PREFERRED EMBODIMENT

The present system and method schedules real-time I/O Operation so as to improve VOD system throughput while satisfying real-time service requirements. The approach takes into account the observed storage server response time (i.e the response time of the storage server that has the requested data), together with performance measures such as the expected storage server load and block placement among the storage servers, to select a block replica to be read. Each client has a corresponding file system (which can be shared with other clients). Whenever a response is received from a storage server, the file systems update a local copy of the observed storage server's response times and the time of day at which each response was observed.

The expected load information on different storage servers is maintained in the following manner. Both the file systems and the storage servers maintain an array of load counts on each storage server and the associated local timestamp at the storage server. The file systems and the storage servers need not have synchronized clocks. This information is piggybacked on every message between the file systems and the storage servers. On receiving this information each node (file system or storage server) updates its load count array to reflect the latest load information for a storage server based on the associated timestamp. Using the above mechanism a file system obtains load information even about those storage servers it has not accessed recently. It should be understood that each node may contain a file system, a storage server or both.

Figure 1:
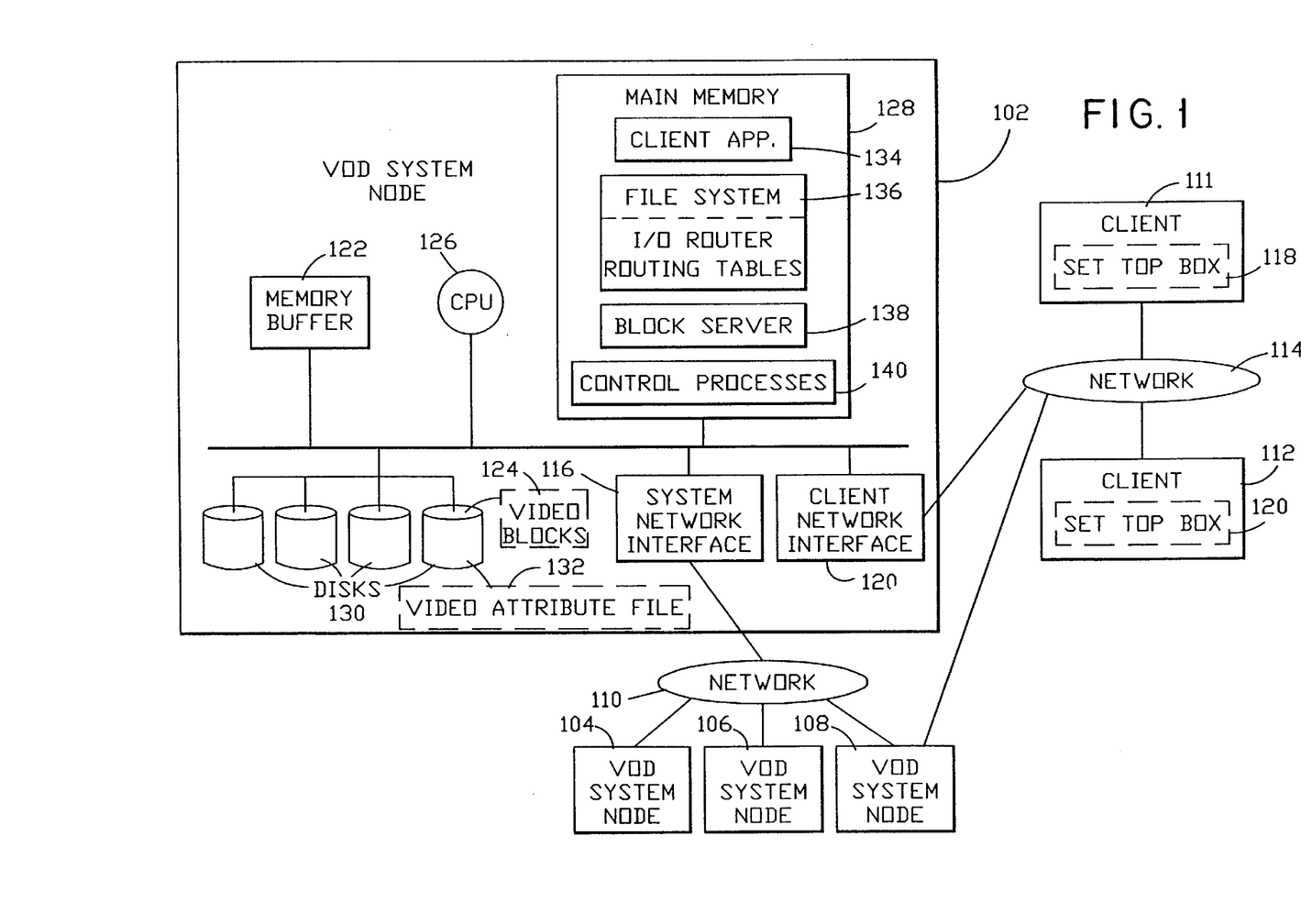
FIG. 1 is a block diagram of a distributed video-on-demand system according to an embodiment of the present invention.

FIG. 1 is a block diagram of a distributed video-on-demand system according to an embodiment of the present invention. Computer systems (VOD System nodes) 102–108 are interconnected by way of a first (system) communication network (or switch) 110. The computer systems can be of the same or different types and can have different performance characteristics (from one another) depending on system type and configuration. One or more of the VOD nodes is also interconnected with clients 111, 112 by way of a second (client) communication network 114. Each VOD System Node includes a system network interface 116 which provides an electronic and communication interface to the system communication network 110. Nodes connected to the client communication network also include a client network interface 120 which provides an electronic and communication interface to the client communication network 114.

Each VOD System Node 102–108 includes a buffer memory 122 for the temporary storage of retrieved video blocks 124 and other messages and a processor (cpu) 126 which operates under control of various programs residing in a main memory 128. At least some of the nodes 102–108 include disks 130 which have movies stored thereon. Each of the movies is made up of a number of the video blocks 124. The video blocks 124 for a given video (e.g. movie) can be distributed (e.g. striped) across the disks 130 of a disk array within a single system or across the disks of multiple VOD system nodes. In the latter case, the video blocks are communicated from a VOD System Node that has a requested block on its disks to the VOD System Node serving a requesting client by way of the system communication network 110. The requested block is then sent to the requesting client by way of the client communication network 114. Attributes (size, space, play history, block mapping, etc.) of each video are stored in an attribute file 132 which is also stored on one or more of the disks 130. Similar to the video-blocks, the attributes can also be communicated between VOD System Nodes by way of the system communication network 110.

The programs in the main memory will now be described. It should be understood that each of the programs causes the VOD System Node to perform a "process" under the program's direction. At least one of the computer systems has one or more client applications 134 which communicate with the client's 111, 112 by way of the client communication network 114. The client applications also start, stop, pause and resume video playback upon client request. Similarly, at least one of the computer systems includes one or more file systems 136 which manage block placement and retrieval of the video blocks on the disks. The file systems include an I/O Router 136a which is responsible for selecting the storage server from which to retrieve the requested block.

Systems with disks also include a block server program 138 which is responsible for the physical retrieval of blocks from the disks and for providing the blocks to a requesting filesystem (which could be on any of the VOD System Nodes, including those without local disks). The block server 138 is also referred to herein as a "storage server" or simply a "server".

The set of programs stored in the main memory 128 also include control process modules 140 that, on various nodes, reserve a channel (i.e., resources) and set up viewing sessions before the start of video playback. Those of skill in the art will recognize that a number of other conventional software controlled processes, not described in detail here, are also involved in the control and support of the video server functions.

The VOD System nodes 102–108 can be embodied using any processor of sufficient performance for the number of video streams to be supported. For example, a small capacity video server could be embodied using a RISC System/6000 TM system while a larger capacity server could be embodied using an ES/9000 TM system (both available form International Business Machines Corporation of Armonk, N.Y.). The disks 130 can be embodied as any conventional disk subsystem or disk array. The communication networks 110, 114 can be, for example, fiber optic networks, conventional bidirectional cable networks or any other network of sufficiently high bandwidth to handle the real-time requirements of video data delivery in a VOD System. The clients can be embodied as set-top boxes 118, 120, or workstations or a combination of both.

Figure 2A:
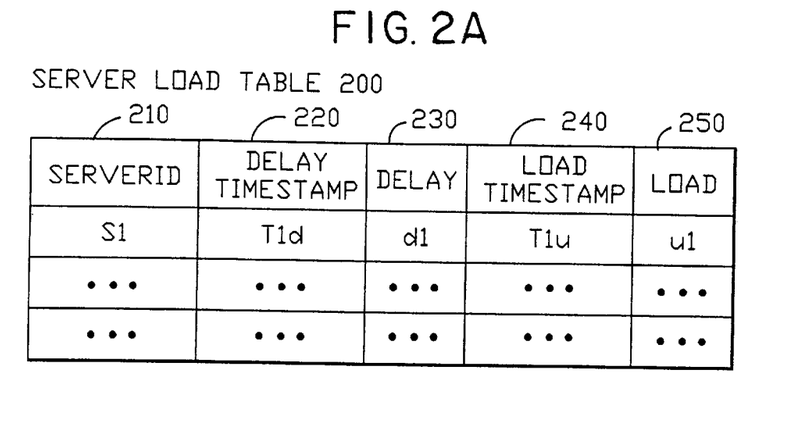
FIGS. 2A–2C shows the data structures used by the system of FIG. 1.

FIG. 2A shows the Server Load Table 200. The Server Load Table is a data structure maintained by both the block server 138 and the file systems 136 on each node for tracking load information about the block servers. Each VOD System Node maintains its own copy of the Server Load Table. Each copy is updated to reflect the latest loads by way of piggyback information sent along (from one node to another) with video data blocks. Specifically, a copy of the table is piggybacked by the file systems onto each request and by the block servers onto each response.

Each entry in the Server Load Table 200 tracks (stores) the observed response time and load of each block server 138 in the VOD System Node. Each row contains the serverId 210, the observed delay 230 of the last response from that server, the delay timestamp 220 containing the time at which the delay 230 was observed, and the server load 250 as reported by the server (e.g. server utilization). The load timestamp 240 is the server generated time stamp of the time at which the load 250 was reported. The load can be, for example, defined as the queue length (number of outstanding requests) at the server or as the server utilization measured as the number of requests served per unit time.

Figure 2B:
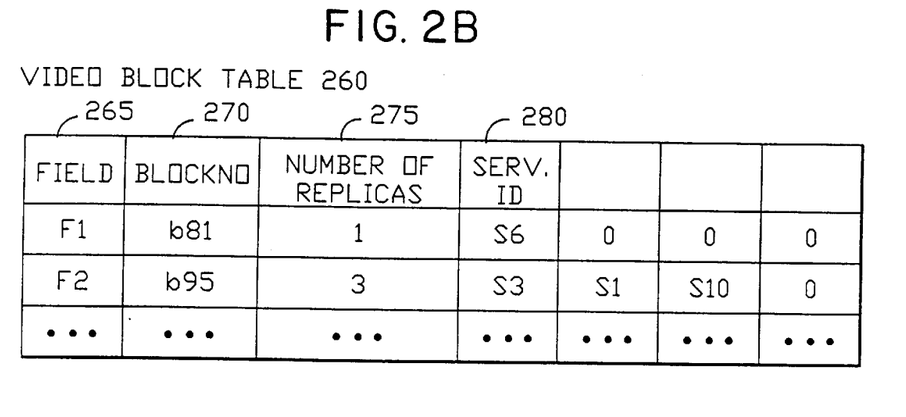

The file system also maintains routing tables 136b. The Routing Tables include a Video Block Table 260 (shown in more detail in FIG. 2B) and a Request Table 285 (shown in more detail in FIG. 2C). The Video Block Table 260 contains a row for each video block. Each row contains the file identifier (fileId) 265 for the video block, the video block number (blockNo) 270, the number of replicas 275 of the video block and a list (Serv. Id) 280 of the storage servers (and therefore the VOD System Nodes) that have the video block. In the example shown, file F1 block b81 has 1 replica on server S6 whereas file F2 block b95 has three replicas on servers S3, S1, S10.

Figure 2C:
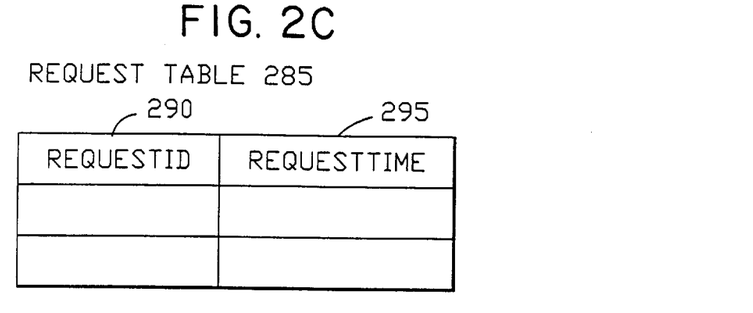

The Request Table 285 is used to update the Delay fields 230 of the Server Load Table 200. Each row of the Request Table corresponds to an outstanding request and contains an identifier for the request (requested) 290. The Request Time field (requestTime) 295 is the time (according to the file system's clock) that the request was sent to the server and is set by the file system when the request is sent.

Figure 3A:
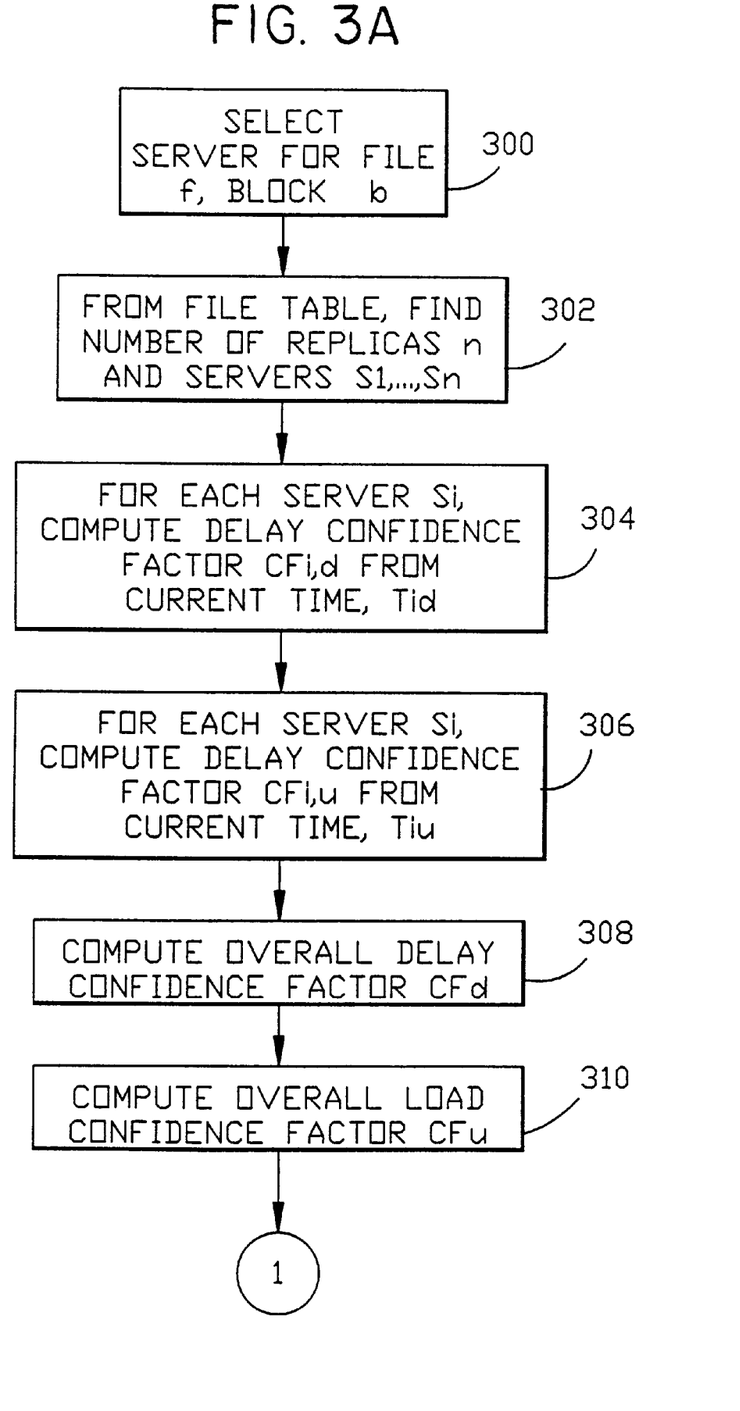
FIG. 3A and 3B show the procedure used by the client to select a server.
Figure 3B:
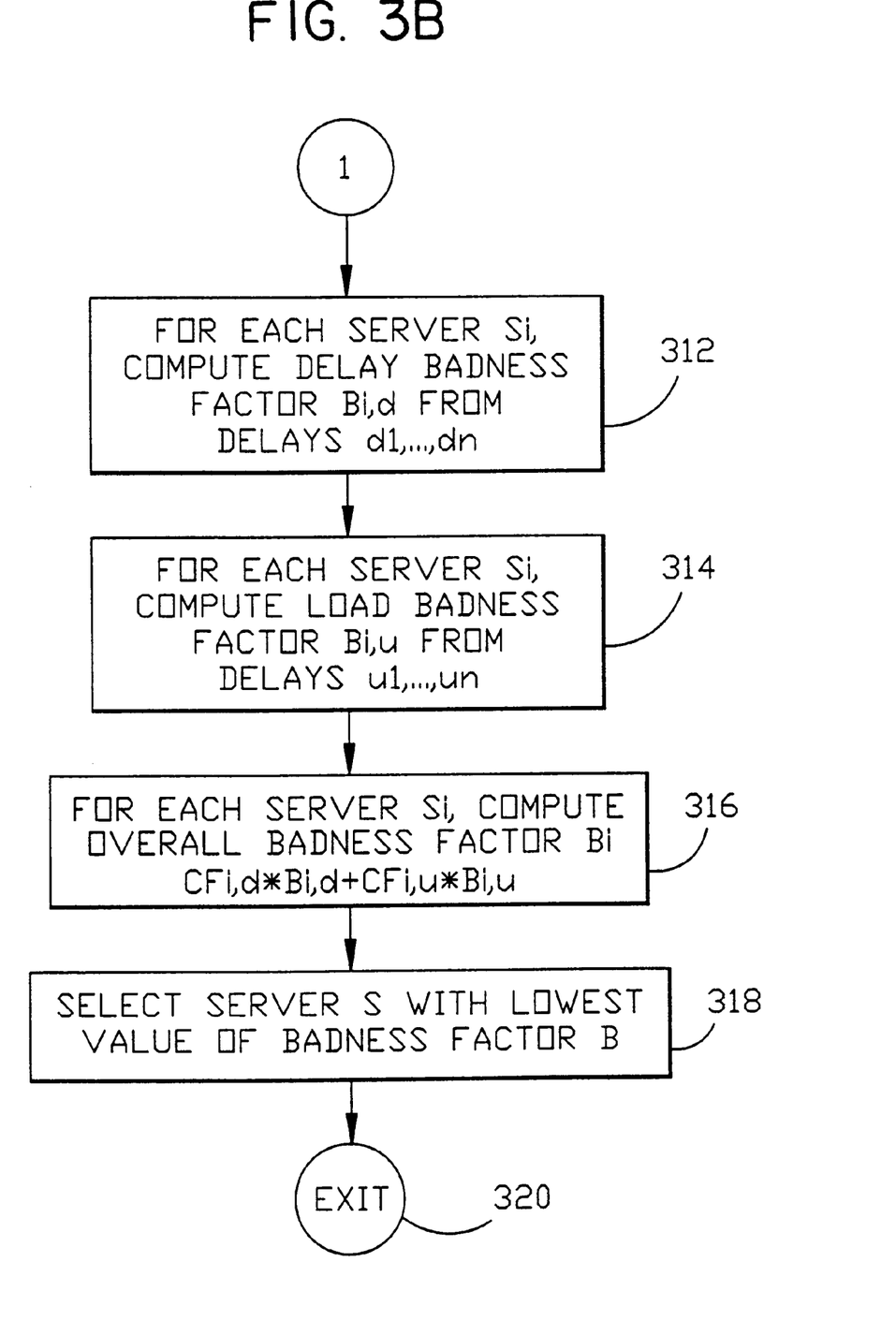

The steps used by the file system to select a server when it is necessary to request a new file block are shown in FIGS. 3A–3B. The server table 200 contains the observed response time and the reported server load. Both types of information are weighted as follows by appropriate confidence factors when deciding which server to select. In step 302, the file system searches the Video Block Table 260 using the fileId 265 and blockNos 270 of the requested block to find the number of replicas 275 (denoted by n) and the server ids 280 (S1, . . . ,Sn) of the servers on which these blocks reside. In step 304, the file system computes a delay confidence factor $CF_{i,d}$ for each server Si based on the current time t and the delay timestamp 220 (Ti,d). This factor measures the level of confidence of the file system that the observed delay 230 is still current. The delay confidence factor is low if Ti,d is in the remote past. In the present embodiment, the file system computes $Cf_{i,d}=1/(e^x)$ where x is given by (t−Ti,d)/T and T is a pre-determined scaling factor. Similarly, in step 306 the file system computes a load confidence factor Cfi,u for each server based upon the load timestamp 240 as $Cf_{i,u}=1/(e^y)$ where y is given by (t−Ti,u)/T.

In step 308, the file system computes an overall delay confidence factor CFd as follows. It first computes Pd, the product of all the server delay confidence factors Cfi,d. Note that Pd will be high only if all the individual Cfi,d are high. Similarly, the file system computes Pu, the product of all the Cfi,u. Cfd is then computed as wd*Pd/(wd*Pd+wu*Pu) where wd and wu are weights that indicate the relative importance of the delay 240 and the load 250. If both are to be given equal importance, wd=wu=1. In step 310 the load confidence factor CFu is computed as wu*Pu/(wd*Pd+wu*Pu).

In step 312, the file system computes a delay badness factor Bi,d for each server Si given by di/(d1+ . . . +dn). Bi,d is high if the delay of server i is high relative to the other servers. In step 314, the file system computes a load badness factor Bi,u for each Si given by ui/(u1+ . . . un). In step 316, the file system computes the overall badness factor Bi for each server Si as Cfi,d*Bi,d+Cfi,u*Bi,u. In step 318, the file system selects the server with the lowest badness factor Bi and exits in step 320.

Figure 4:
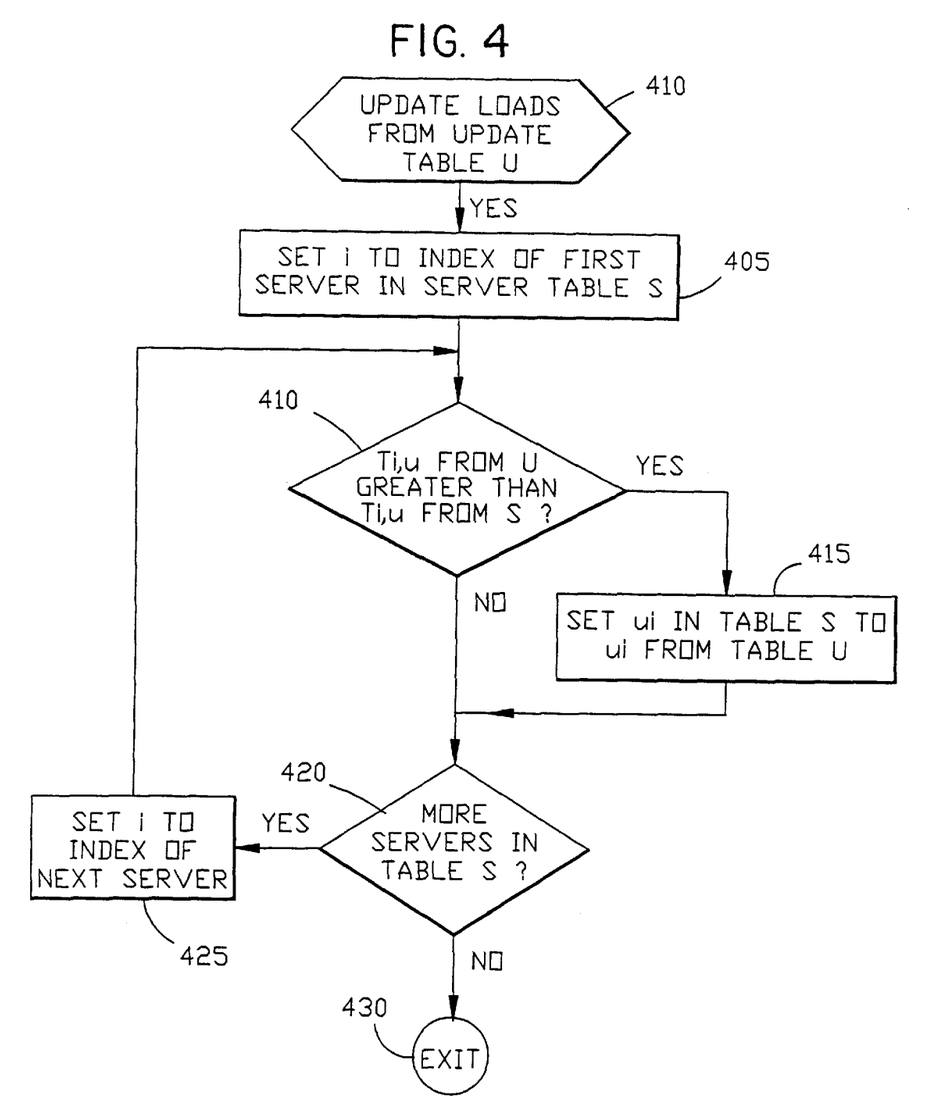
FIG. 4 shows the procedure used by the client to update the server performance measures.
Figure 6:
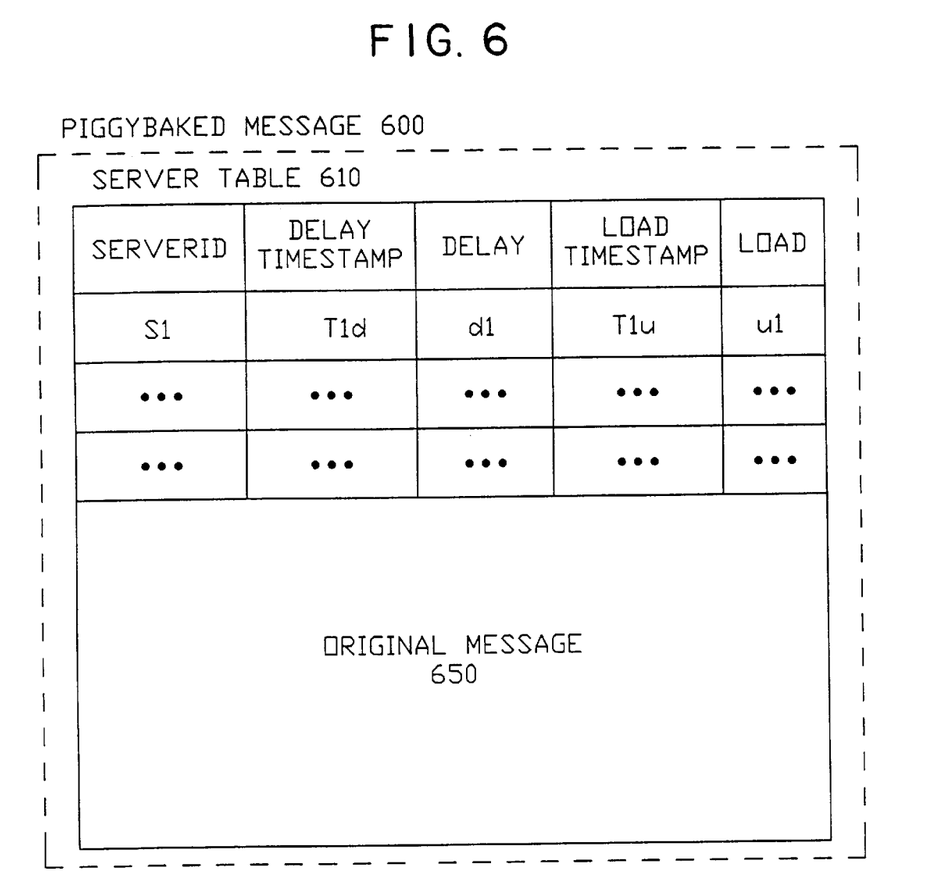
FIG. 6 shows the format of a message including piggy backed performance data.

FIG. 4 shows the steps used by the file systems and servers to update the loads 250 in the Server Load Table 200. These steps are executed whenever the file system receives a message from the server or when the server receives a request from the file system. In step 410, the server (or file system) extracts the update Server Load Table 610 (U) that was piggybacked on the request (or response). The format of the piggybacked message 600 including the update Server Load Table 610 is shown in FIG. 6. The update Server Load Table 610 is organized in the same way and includes the same fields as the Server Load Table 200.

In subsequent steps, the server (or file system) scans the local copy of the Server Load Table 200 (S) and updates the appropriate load 250. In step 405, the index i is set to the index of the first row in the Server Load Table (S). In step 410, the load timestamp 240 from table U 610 and the load timestamp 240 from table S 200 are compared. If the load timestamp 240 from table U is more recent, the server load 250 in table S is set to the value of server load (Load) 250 in table U. In step 420, a check is made to see if there are more servers in table S. If so, the index i is set to the next row and step 410 is executed. If not, the update load procedure terminates in step 430.

Figure 5:
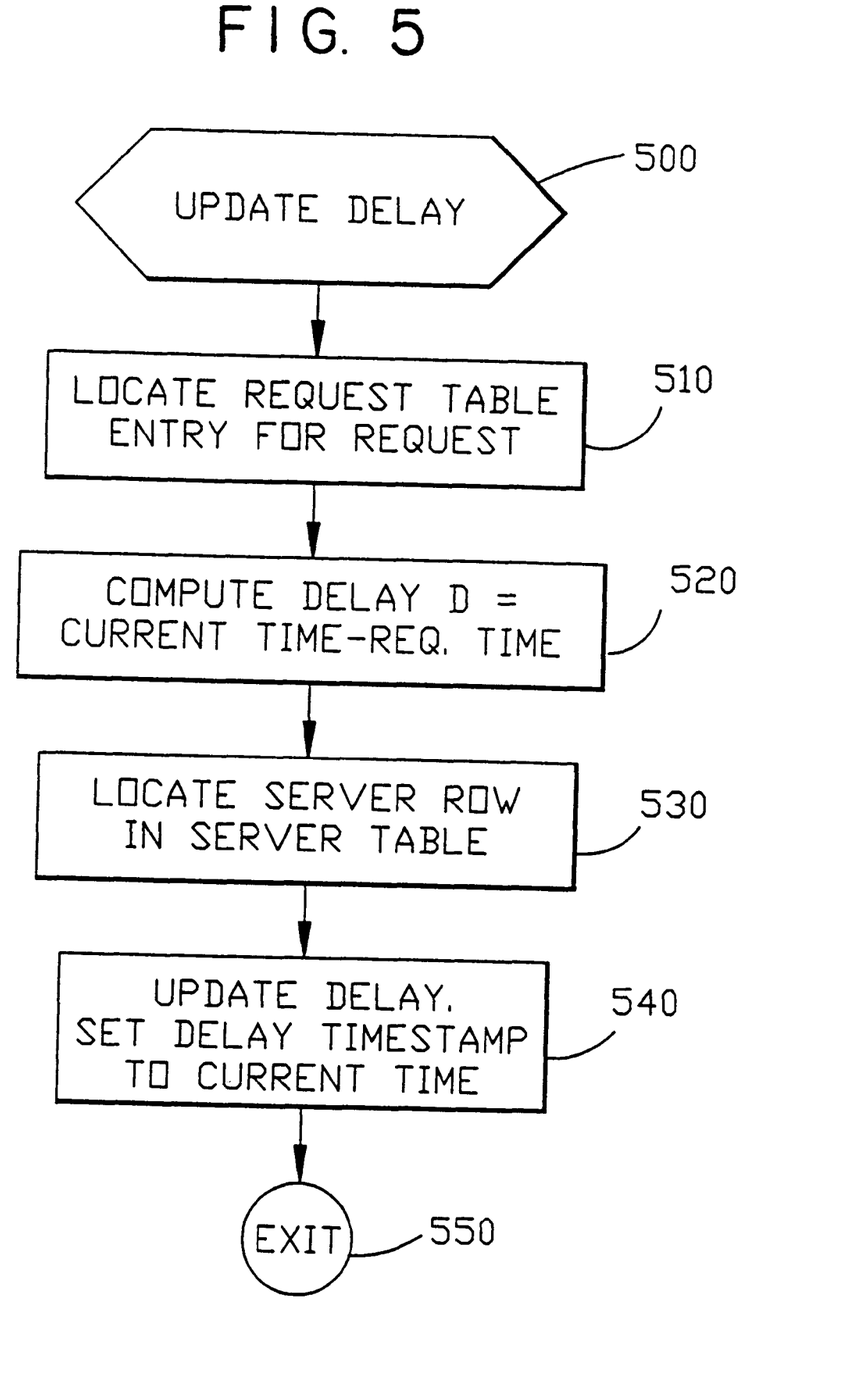
FIG. 5 shows the procedure used by the client to update the observed server response time.

FIG. 5 shows the steps used by the file systems to update the delays 230 in the server load table 200. This step is executed whenever a response is received from a server. In step 510, the file system locates the entries in the Request Table 285 corresponding to this request. In step 520, the response time for this request is computed as the difference between the current time and the request time 295. In step 530, the file system locates the row corresponding to this server in the Server Load Table 200. The delay field 230 is set to the response time computed in step 520 and the delay timestamp field 220 is set to the current time.

Figure 7:
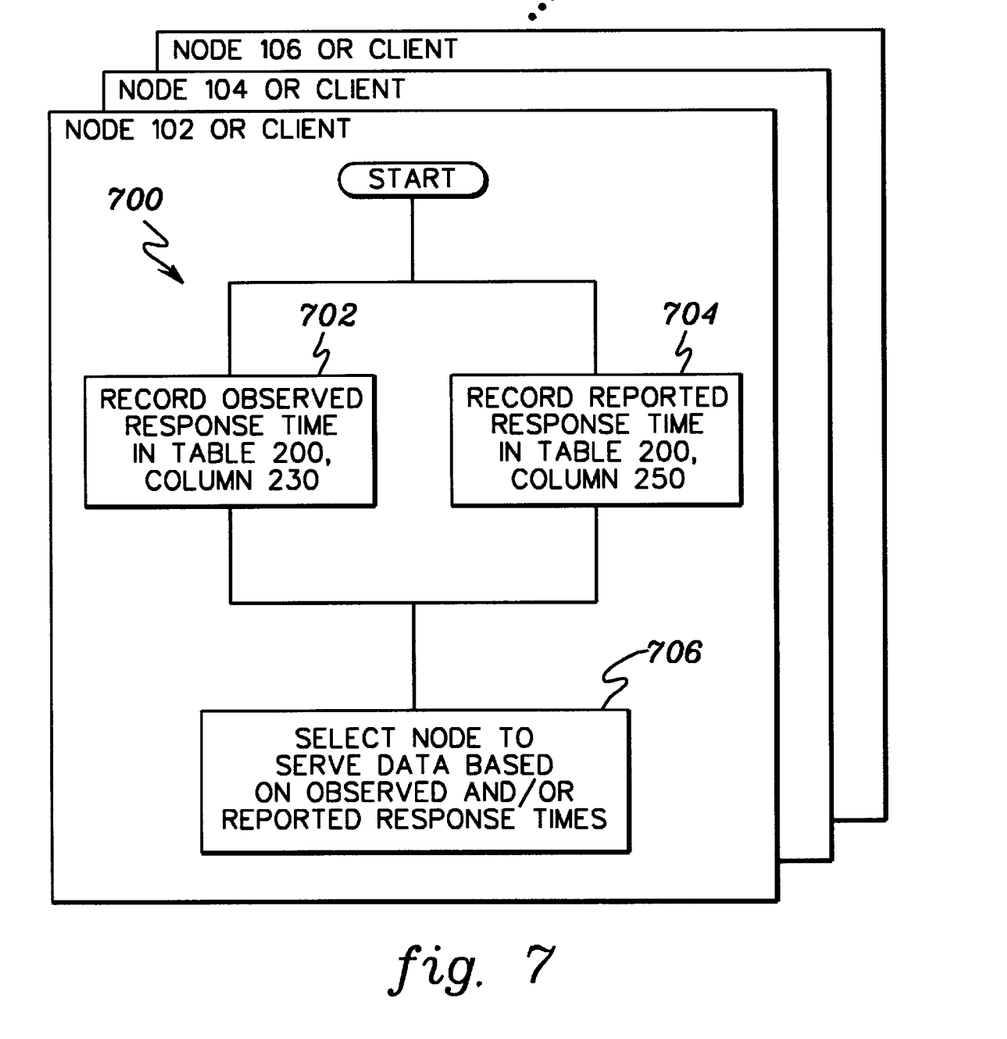
FIG. 7 is a flow diagram of an exemplary method used to select a server in accordance with the present invention.

FIG. 7 is a flow diagram which summarizes the above-described technique for selecting a server in accordance with the present invention. (The steps of method 700 therein may be performed continuously or sequentially, and no timing requirements should be inferred from this flow diagram.) At each node (e.g., system nodes 102, 104, 106 . . . in FIG. 1 or a client) method 700 is executed, including step 702, "Record Observed Response Time In Table 200, Column 230." This response time is that which a node may observe whenever a response is received from a queried server. Step 704 also occurs, "Record Reported Response Time in Table 200, Column 250," in which a server load, as reported from the respective server itself, is also updated in Table 200. Based on either or both the observed response times and reported response times of steps 702 and 704, a server is selected to serve the data, step 706. By continuously and collaboratively (e.g., via piggyback on messages) updating the observed response times and reported response times for each server at each node (client or server), each node can make informed decisions regarding the server node from which to extract data (e.g., video data).

While the present embodiment is described in conjunction with load information being monitored at the storage server level, the principles of the present invention can also be readily applied at the disk level. Thus, observed and reported disk performance can be used, even in the context of a single node video server, to select a disk from which to obtain a video data block replica.

Now that the invention has been described by way of the preferred embodiment, various modifications and improvements will occur to those of skill in the art. Thus, it should be understood that the preferred embodiment has been provided as an example and not as a limitation. The scope of the invention is defined by the appended claims.

We claim:

1. In a distributed server system of a type wherein at least one node provides data to at least one client and wherein at least some of the data is replicated on multiple nodes, a method for selecting a node to serve the data for provision to the at least one client, comprising the steps of:

recording observed response characteristics at a given node, of said multiple nodes and said at least one client, the observed response characteristics being response information concerning nodes in the server system as observed by the given node;

recording reported response characteristics, the reported response characteristics being response information concerning other nodes as reported to the given node by at least one other node in the distributed server system; and, selecting a node to serve replicated data based on which nodes include a copy of the replicated data and based on at least one of the observed response characteristics and the reported response characteristics.

2. The method of claim 1 wherein the reported response characteristics are sent to the given node as information piggybacked on other messages passed between the nodes.

3. The method of claim 1 wherein the observed characteristics include a measured delay in retrieving the data.

4. The method of claim 1 wherein the reported characteristics include a measure of performance of load on each node.

5. The method of claim 4 wherein the measure of performance is reported along with a time stamp indicative of when the measure was taken.

6. The method of claim 5 wherein the measure of performance is stored by the given node and wherein only the measure of performance having a most recent time stamp for each node is retained by the given node.

7. The method of claim 3 wherein the replicated block is retrieved from the node having the shortest measured delay.

8. The method of claim 1 wherein the observed response characteristics and the reported response characteristics are each given a weight and wherein the selecting is also based on the weight.

9. The method of claim 8 wherein the selecting is based on the response characteristics having the highest total weight.

10. The method of claim 1 comprising the further step of providing the replicated data to the at least one client.

11. A distributed server system, comprising:

a plurality of nodes coupled by way of a first communication network;

a plurality of clients coupled to the plurality of nodes;

at least two of the plurality of nodes including a storage subsystem having replicated blocks of data stored thereon;

means in a given one, of the at least two nodes and the plurality of clients, for recording observed response characteristics, the observed response characteristics being response information concerning nodes in the server system as observed by the given one of the nodes;

means, in the given one of the nodes, for recording reported response characteristics, the reported response characteristics being response information concerning other nodes as reported to the given one of the nodes by at least one other nodes; and, means, in the given one of the nodes, for selecting a node to serve the replicated data block based on which of the nodes includes a copy of the replicated data block and based on at least one of the observed response characteristics and the reported response characteristics.

12. The system of claim 11 wherein each of the nodes having a replicated copy of the block includes means for sending the reported response characteristics to the given node as information piggybacked on other internode messages.

13. The system of claim 11 wherein the observed characteristics include a measured delay in retrieving the blocks.

14. The system of claim 12 wherein the reported characteristics include a measure of performance of load on each node.

15. The system of claim 14 wherein the means for sending include means for including a time stamp indicative of when the measure of performance was taken.

16. The system of claim 15 wherein the given node includes means for storing the measure of performance and for retaining the measure of performance having a most recent time stamp for each node.

17. The system of claim 15 wherein the means for selecting retrieves the replicated block from the node having the shortest measured delay.

18. The system of claim 11 wherein the observed response characteristics and the reported response characteristics are each given a weight and wherein the means for selecting selects the node at least in part based on the weight.

19. The system of claim 18 wherein the means for selecting, selects the node having the highest total weight.

20. In a server system of a type wherein at least one node provides blocks of data to clients and some of the blocks of data are replicated on multiple storage devices, a method for selecting a storage device from which to retrieve the data for provision to the clients, comprising the steps of:

recording observed response characteristics, the observed response characteristics being response information concerning performance of a plurality of the storage devices in the server system as observed by the at least one node;

recording reported response characteristics, the reported response characteristics being response information concerning the plurality of the storage devices as reported to the at least one node in the server system by computer processes managing the storage devices; and, selecting a storage device from which to retrieve the replicated data block based on which storage devices include a copy of the replicated data block and based on at least one of the observed response characteristics and the reported response characteristics.

21. A distributed computing system, comprising:

a plurality of nodes coupled by way of a first communication network;

a plurality of clients coupled to the plurality of nodes;

at least two nodes of the plurality of nodes including a storage subsystem having replicated blocks of data stored thereon;

a first table instantiated in a memory in a given one, of the plurality of nodes and the plurality of clients, dedicated to recording observed response characteristics, the observed response characteristics being response information concerning nodes in the system as observed by the given one of the nodes; and, a second table instantiated in the memory, dedicated to recording reported response characteristics, the reported response characteristics being response information concerning other nodes as reported to the given one of the nodes by at least one other node.

22. The system of claim 21 further comprising:

means, in the given one of the nodes, for selecting a node to serve the replicated data block based on which of the nodes includes a copy of the replicated data block and based on at least one of the observed response characteristics and the reported response characteristics.

23. A method of controlling a distributed computing system of a type wherein a plurality of nodes are coupled by way of a first communication network and wherein a plurality of clients are coupled to the plurality of nodes, at least two of the plurality of nodes having the capability of performing an identical function, comprising the steps of:

recording observed response characteristics at a given one, of the plurality of nodes and the plurality of clients, the observed response characteristics being response information concerning nodes in the system as observed by the given one of the nodes;

recording reported response characteristics, the reported response characteristics being response information concerning other nodes as reported to the given one of the nodes by at least one other nodes; and, selecting a node to perform the function based on which of the nodes can perform the function and based on at least one of the observed response characteristics and the reported response characteristics.

24. The method of claim 1, wherein each of at least two of said multiple nodes and said at least one client node:

records observed response characteristics, the observed response characteristics being response information concerning nodes in the server system as observed by the respective one of said at least two nodes; and records reported response characteristics, the reported response characteristics being response information concerning other nodes as reported to the respective one of said at least two nodes.

25. The system of claim 11, wherein each of two given nodes, and the at least two nodes or the plurality of clients, includes:

means for recording observed response characteristics, the observed response characteristics being response information concerning nodes in the server system as observed by the respective one of said two given nodes; and means for recording reported response characteristics, the reported response characteristics being response information concerning other nodes as reported to the respective one of said two given nodes.

26. The method of claim 20, wherein each of at least two nodes, including said at least one node, provides blocks of data to clients and some of the blocks of data are replicated on multiple storage devices in each of said at least two nodes, wherein each of said at least two nodes:

records observed response characteristics, the observed response characteristics being response information concerning performance of a plurality of the storage devices in the server system as observed by the respective one of said at least two nodes; and records reported response characteristics, the reported response characteristics being response information concerning the plurality of the storage devices as reported to the respective one said at least two nodes by computer processes managing the storage devices.

27. The distributed computing system of claim 21, wherein first and second tables are instantiated in a memory in each of two given nodes of the plurality of nodes and the plurality of clients, for recording observed response characteristics concerning nodes in the system as observed by the respective one of the two given nodes and recording reported response characteristics concerning other nodes as reported to the respective one of the two given nodes by at least one other node.

28. The method of claim 23, wherein each of two given nodes, of the plurality of nodes and the plurality of client nodes:
- records observed response characteristics, the observed response characteristics being response information concerning nodes in the system as observed by the respective one of the two given nodes; and
- records reported response characteristics, the reported response characteristics being response information concerning other nodes as reported to the respective one of the two given nodes by at least one other node.

29. The method of claim 24, wherein the reported response characteristics are sent to said each of at least two nodes as information piggybacked on other messages sent to said nodes.

30. The system of claim 25, wherein the reported response characteristics are sent to said each of said two given nodes as information piggybacked on other messages sent to said nodes.

31. The method of claim 26, wherein the reported response characteristics are sent to said each of at least two nodes as information piggybacked on other messages sent to said nodes.

32. The distributed computing system of claim 27, wherein the reported response characteristics are sent to said each of two given nodes as information piggybacked on other messages sent to said nodes.

33. The method of claim 28, wherein the reported response characteristics are sent to said each of two given nodes as information piggybacked on other messages sent to said nodes.

* * * * *